United States Patent
Schmitt et al.

(10) Patent No.: US 11,364,910 B1
(45) Date of Patent: Jun. 21, 2022

(54) EMERGENCY VEHICLE DETECTION SYSTEM AND METHOD

(71) Applicant: Motional AD LLC, Boston, MA (US)

(72) Inventors: Paul Schmitt, Merrimack, NH (US);
Jugal Buddhadev, Avalon, PA (US);
Alex Hunter Lang, Culver City, CA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/458,239

(22) Filed: Aug. 26, 2021

(51) Int. Cl.
*B60W 40/02* (2006.01)
*G01S 5/06* (2006.01)
(Continued)

(52) U.S. Cl.
CPC ...... *B60W 30/18009* (2013.01); *B60W 40/02* (2013.01); *B60W 50/0205* (2013.01);
(Continued)

(58) Field of Classification Search
CPC ........... B60W 30/18009; B60W 40/02; B60W 50/0205; B60W 2420/42; B60W 2420/54; B60W 2554/402; B60W 2554/404; B60W 2555/20; G01S 5/06; G06K 9/00208; G06K 9/00825; G06K 9/6265; G06K 9/6289;
(Continued)

(56) References Cited

U.S. PATENT DOCUMENTS 9,275,136 B1  3/2016 Sharfi et al.
2013/0222127 A1* 8/2013 Ray Avalani .......... G08G 1/167
340/436

(Continued)

FOREIGN PATENT DOCUMENTS

DE    2014154128     8/2014
DE    102016118902   4/2017
(Continued)

OTHER PUBLICATIONS

[No. Author Listed], "J3016: Taxonomy and Definitions for Terms Related to On-Road Motor Vehicle Automated Driving Systems" SAE International, Sep. 2016, 30 pages.
(Continued)

*Primary Examiner* — Anshul Sood
(74) *Attorney, Agent, or Firm* — Fish & Richardson P.C.

(57) ABSTRACT

In an embodiment, a method comprises: receiving ambient sound; determining if the ambient sound includes a siren; in accordance with determining that the ambient sound includes a siren, determining a first location associated with the siren; receiving a camera image; determining if the camera image includes a flashing light; in accordance with determining that the camera image includes a flashing light, determining a second location associated with the flashing light; 3D data; determining if the 3D data includes an object; in accordance with determining that the 3D data includes an object, determining a third location associated with the object; determining a presence of an emergency vehicle based on the siren, detected flashing light and detected object; determining an estimated location of the emergency vehicle based on the first, second and third locations; and initiating an action related to the vehicle based on the determined presence and location.

21 Claims, 6 Drawing Sheets

(51) Int. Cl.
| | |
|---|---|
| *G08G 1/017* | (2006.01) |
| *G08G 1/04* | (2006.01) |
| *B60W 30/18* | (2012.01) |
| *G06K 9/62* | (2022.01) |
| *G08G 1/16* | (2006.01) |
| *G10L 25/51* | (2013.01) |
| *B60W 50/02* | (2012.01) |
| *G06T 7/73* | (2017.01) |
| *G06V 20/58* | (2022.01) |
| *G06V 20/64* | (2022.01) |

(52) U.S. Cl.
CPC .............. *G01S 5/06* (2013.01); *G06K 9/6265* (2013.01); *G06K 9/6289* (2013.01); *G06T 7/73* (2017.01); *G06V 20/584* (2022.01); *G06V 20/647* (2022.01); *G08G 1/04* (2013.01); *G08G 1/166* (2013.01); *G10L 25/51* (2013.01); *B60W 2420/42* (2013.01); *B60W 2420/54* (2013.01); *B60W 2554/402* (2020.02); *B60W 2554/404* (2020.02); *B60W 2555/20* (2020.02); *G06T 2207/30261* (2013.01)

(58) Field of Classification Search
CPC ... G06T 7/73; G06T 2207/30261; G08G 1/04; G08G 1/166; G10L 25/51
See application file for complete search history.

(56) References Cited

U.S. PATENT DOCUMENTS

| | | | |
|---|---|---|---|
| 2016/0343247 A1 | 11/2016 | Strassberger | |
| 2017/0217440 A1* | 8/2017 | Kato | B60W 30/09 |
| 2017/0240096 A1 | 8/2017 | Ross et al. | |
| 2017/0249839 A1 | 8/2017 | Becker et al. | |
| 2017/0305427 A1 | 10/2017 | Kim et al. | |
| 2018/0088887 A1 | 3/2018 | LeBlanc et al. | |
| 2018/0137756 A1 | 5/2018 | Moosaei | |
| 2018/0233047 A1* | 8/2018 | Mandeville-Clarke | B60W 30/00 |
| 2018/0297593 A1* | 10/2018 | Pitale | G06K 9/00825 |
| 2018/0374347 A1 | 12/2018 | Silver et al. | |
| 2019/0027032 A1 | 1/2019 | Arunachalam | |
| 2019/0035269 A1 | 1/2019 | Demovan | |
| 2019/0049989 A1 | 2/2019 | Akotkar et al. | |
| 2020/0241552 A1 | 7/2020 | Leenayongwut | |
| 2020/0276973 A1* | 9/2020 | Meijburg | G06K 9/00805 |
| 2021/0034914 A1* | 2/2021 | Bansal | G06K 9/3233 |
| 2021/0103747 A1* | 4/2021 | Moustafa | B60W 40/04 |
| 2021/0125494 A1* | 4/2021 | Cho | G01S 3/8032 |
| 2021/0201676 A1* | 7/2021 | Tariq | G08G 1/0112 |
| 2021/0233554 A1 | 7/2021 | Buddhadev et al. | |
| 2021/0302987 A1* | 9/2021 | Chebiyyam | G05D 1/0238 |

FOREIGN PATENT DOCUMENTS

| | | |
|---|---|---|
| DE | 102020104360 | 10/2020 |
| IN | 3630MU2013 A | 12/2013 |
| WO | WO 2016/19603 | 12/2016 |

OTHER PUBLICATIONS

Abu-El-Haija et al., "YouTube-8M: A Large-Scale Video Classification Benchmark," arXiv: 1609.08675 [cs.CV], Sep. 27, 2016, 10 pages.
Bochkovskiy et al., "Yolov4: Optimal speed and accuracy of object detection. arXiv preprint." ar-Xiv:2004, Apr. 23, 2020, 17 pages.
Klee et al., "Kalman Filters for Time Delay of Arrival-Based Source Localization." Hindawi Publishing Corporation EURASIP Journal on Applied Signal Processing, 2006, Article ID 12378, 15 pages.
Knapp et al., "The Generalized Correlation Method for Estimation of Time Delay." IEEE Transactions on Acoustics, Speech and Signal Processing. Aug. 1976, 24(4):320-327.
Liu et al.,. "Ssd: Single shot multibox detector," European Conference on Computer Vision, Oct. 8, 2016, 21-37.
Mizumachi et al., "Robust Sensing of Approaching Vehicles Relying on Acoustic Cues." Sensors 2014, May 30, 2014, 14(6):9546-9561.
Ren et al.. "Faster r-cnn: Towards real-time object detection with region proposal networks." Advances in Neural Information Processing Systems, Jun. 2015, 28:91-9.
Salamon et al., "A Dataset and Taxonomy for Urban Sound Research," 22nd ACM International Conference on Multimedia, Orlando, FL, USA, Nov. 2014, 1041-1044.
Senocak et al., "Learning to Localize Sound Source in Visual Scenes." arXiv: 1803.03849v1 [cs.CV]. Mar. 10, 2018, 9 pages.
Simonyan et al., "Verv Deep Convolutional Networks for Large-Scale Image Recognition." arXiv: 1409.1556v6 [cs.CV], Apr. 10, 2015, 14 pages.
Valin et al., "Robust Sound Source Localization Using a Microphone Array on a Mobile Robot," Proceedings of IEEE/RSJ International Conference on Intelligent Robots and Systems (IROS), Oct. 27-31, 2003, 1228-1233.
Yabuuchi et al., "Real-time traffic light detection with frequency patterns using a high-speed camera," Sensors, Jul. 2020, 20(14):4035, 18 pages.

* cited by examiner

EMERGENCY VEHICLE DETECTION SYSTEM AND METHOD

FIELD OF THE INVENTION

The description that follows relates to autonomous vehicle systems.

BACKGROUND

Autonomous vehicles include multiple sensors (e.g., cameras, RADAR, LiDAR) that are used to gather data about the operating environment of the vehicle. The data is used by the vehicle to predict the states of agents in the operating environment and to plan and execute a trajectory for the vehicle in the operating environment that accounts for various rules and constraints, such as map constraints (e.g., drivable area), safety constraints (e.g., avoid colliding with other objects) and passenger comfort constraints (e.g., minimize sharp turns, hard braking and fast accelerations/decelerations).

In a typical vehicle operating environment, it is likely that the autonomous vehicle will confront an emergency vehicle (e.g., fire engine, ambulance). In the United States, vehicle operators are required to detect and respond to emergency vehicle sirens and flashing lights. The vehicle operator response is dependent upon the location of the emergency vehicle. For example, if the emergency vehicle is behind the vehicle, the vehicle operator is required to yield to the emergency vehicle. If the emergency vehicle is forward of the vehicle, perhaps at an emergency scene, the vehicle operator, in many states, is required to provide a safety buffer (e.g., a minimum distance) between the vehicle and the emergency vehicle (e.g., "Move Over" laws).

Current emergency vehicle detection systems may only detect sirens or flashing lights. While flashing lights is the predominant method, flashing lights may often be blocked from view by trucks, signs or buildings.

SUMMARY

Techniques are provided for an emergency vehicle detection system and method.

In an embodiment, a method comprises: receiving, with at least one processor, ambient sound; determining, with the at least one processor, if the ambient sound includes a siren sound; in accordance with determining that the ambient sound includes a siren sound, determining, with the at least one processor, a first location associated with the siren sound; receiving, with the at least one processor, a camera image; determining, with the at least one processor, if the camera image includes a flashing light; in accordance with determining that the camera image includes a flashing light, determining, with the at least one processor, a second location associated with the flashing light; receiving, with the at least one processor, three-dimensional (3D) data; determining, with the at least one processor, if the 3D data includes an object; in accordance with determining that the 3D data includes an object, determining, with the at least one processor, a third location associated with the object; determining, with the at least one processor, a presence of an emergency vehicle based on the siren sound, detected flashing light and detected object; determining, with the at least one processor, an estimated location of the emergency vehicle based on the first, second and third locations; and initiating, with the at least one processor, an action related to the vehicle based on the determined presence and location of the emergency vehicle.

In an embodiment, determining if the ambient sound includes a siren sound further comprises: converting the ambient sound to digital signals; analyzing the digital signals for errors and blockage signatures; if errors or blockage signatures are detected, notifying a diagnostic system to determine a cause of the errors or blockage signatures; if errors or blockage signatures are not detected, analyzing the digital signals for siren sounds.

In an embodiment, determining if the ambient sound includes a siren sound further comprises: converting the ambient sound to digital signals; filtering noise from the digital signals; comparing the digital signals to reference signals; and determining a siren sound detection based on results of the comparing.

In an embodiment, determining if the ambient sound includes a siren sound further comprises: converting the ambient sound to digital signals; analyzing, using machine learning, the digital signals; and determining a siren sound detection based on results of the analyzing.

In an embodiment, the method further comprises determining a level of confidence of the siren detection.

In an embodiment, the first location associated with a source of the siren sound is determined based on sound localization base on time of flight (TOF) analysis of signals output by multiple microphones positioned around the vehicle.

In an embodiment, the first location associated with the source of the siren sound is determined based on locations and orientations of multiple unidirectional microphones, and the first location is determined based on an intensity of a key signature signal obtained from analysis of output signals of the multiple unidirectional microphones and their respective locations and orientations.

In an embodiment, determining if the camera image includes a flashing light further comprises: analyzing the camera image for errors and blockage signatures; if errors or blockage signatures are detected, notifying a diagnostic system to determine a cause of the errors or blockage signatures; if errors or blockage signatures are not detected, analyzing the camera image to determine if the camera image includes a flashing light.

In an embodiment, determining if the camera image includes a flashing light, further comprises: filtering the camera image to remove low intensity light signals, resulting in a high intensity image; comparing the high intensity image to a reference image; and determining a flashing light detection based on results of the comparing.

In an embodiment, determining if the camera image includes a flashing light, further comprises: analyzing, using machine learning, the camera image; and predicting a flashing light detection based on results of the analyzing.

In an embodiment, the method further comprises determining a level of confidence of the flashing light detection.

In an embodiment, the analyzing, using machine learning, includes analyzing the camera image using a neural network that is trained to differentiate bright flashing lights from other bright lights.

In an embodiment, the second location associated with the flashing light is determined by: detecting flashing light signatures in multiple camera images captured by multiple cameras; and determining a radial location of the flashing light based on a position and orientation of each camera of the multiple cameras; or determining the second location based on triangulation of the positions and orientations of the multiple cameras.

In an embodiment, determining if the 3D data includes an object further comprises: analyzing the 3D data for errors and blockage signatures; if errors or blockage signatures are detected, notifying a diagnostic system to determine a cause of the errors or blockage signatures; if errors or blockage signatures are not detected, analyzing the 3D data to determine if the 3D data includes an object.

In an embodiment, determining if the 3D data includes an object, further comprises: filtering the 3D data to remove noise; separating the 3D data into groups with similar characteristics; and analyzing, using machine learning, the groups to determine an object detection.

In an embodiment, the method further comprises: determining a level of confidence of the object detection.

In an embodiment, determining the third location comprises determining a radial location of the object based on analysis of a sensor position and orientation of a sensor that detected the object.

In an embodiment, determining the third location comprises determining a radial location of the object based on analysis of a sensor position and orientation of a sensor that detected the object.

In an embodiment, determining the presence and the location of the emergency vehicle, further comprises: comparing siren, flashing light and object detections to determining whether the siren, flashing light and object detections match; and in accordance with determining a match, generating a signal indicating the presence of the emergency.

In an embodiment, the method further comprises tracking the emergency vehicle based on the location of the emergency vehicle.

In an embodiment, a system comprises: at least one processor; memory storing instructions that when executed by the at least one processor, cause the at least one processor to perform any of the methods recited above.

In an embodiment, a computer-readable storage medium having stored thereon instructions, that when executed by at least one processor, causes the at least one processor to perform any one of the methods recited above.

One or more of the disclosed embodiments provide one or more of the following advantages. A vehicle can accurately determine the presence and location of emergency vehicles and execute vehicle behaviors in response that detection in accordance with state vehicle operator regulations, such as yielding and moving over. In an embodiment, a planner, perception module, a vehicle controller or any other application or subsystem of a semi-autonomous or fully autonomous vehicle can make more accurate determinations of agent states (e.g., position, velocity, heading) in the operating environment of the vehicle, including but not limited to determining that other vehicles will slow down, or merge away from the emergency vehicle. In an embodiment, cloud-based, remote vehicle assistance can be enabled to monitor/manage an emergency vehicle encounter and take action as needed, such as taking temporary control of the vehicle.

These and other aspects, features, and implementations can be expressed as methods, apparatus, systems, components, program products, means or steps for performing a function, and in other ways. These and other aspects, features, and implementations will become apparent from the following descriptions, including the claims.

DETAILED DESCRIPTION

Figure 1:
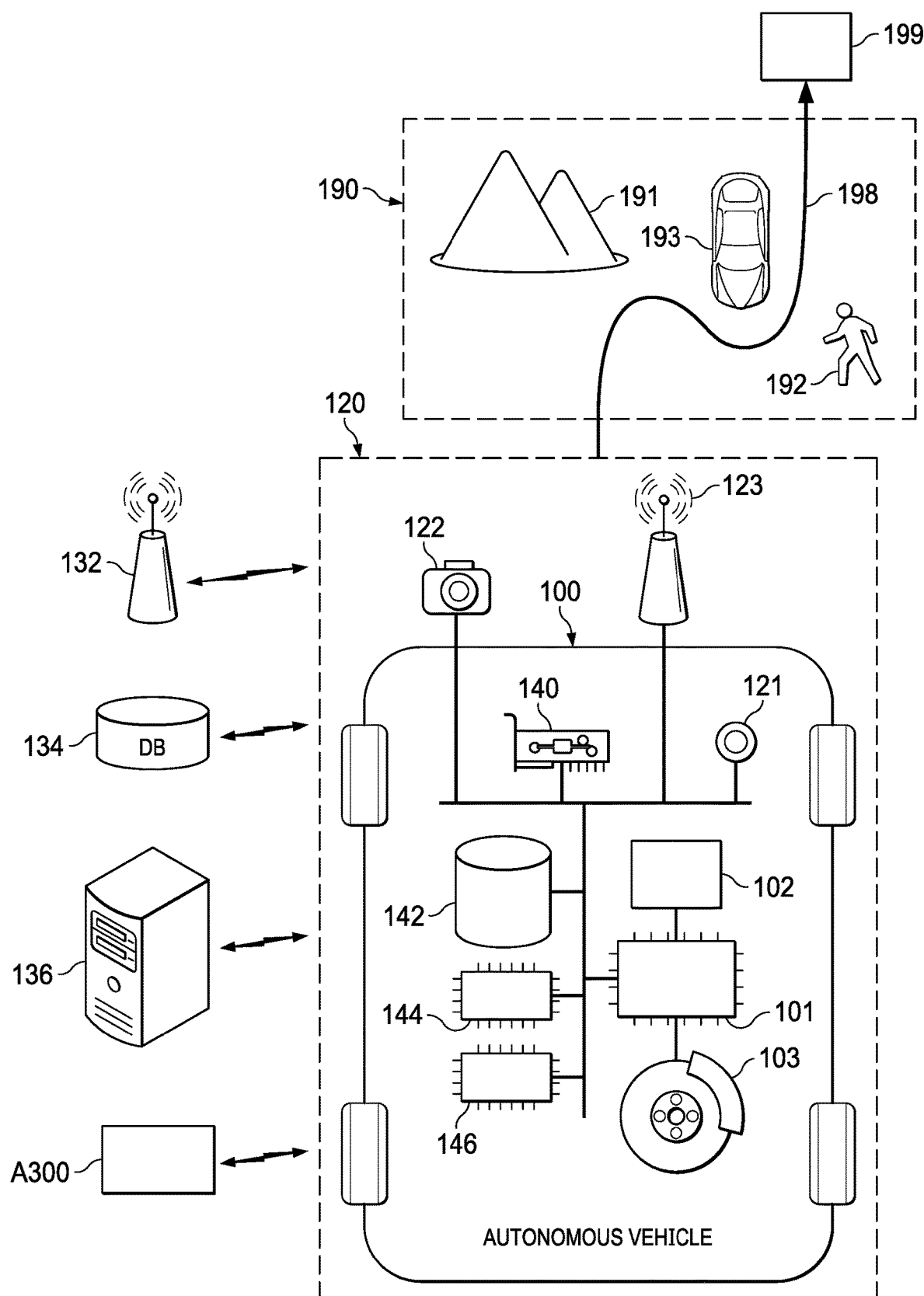
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Emergency Vehicle Detection System and Method General Overview Techniques are provided for an emergency vehicle detection system and method. Ambient sound, camera images and three-dimensional (3D) sensors (e.g., LiDAR, RADAR, SONAR) are captured analyzed to detect siren sounds, flashing lights and objects in an operating environment of a vehicle, such as an autonomous vehicle operating environment. Additionally, a type of siren, flashing light and object are also determined. After detection, the locations of the siren sounds, flashing lights and objects are estimated. The estimated location and determined types are fused to determine a presence and location of an emergency vehicle in the operating environment, and in some implementations the type of emergency vehicle.

The estimated location can be used by a downstream system of an autonomous vehicle stack (e.g., a planner, perception module, vehicle controller) to determine a route or trajectory of the vehicle in the operating environment. Using the emergency vehicle location, the planner, perception module or vehicle controller of the vehicle can make more accurate determinations of agent states in the operating environment of the vehicle, such as determining that other vehicles will slow down, or merge away from the emergency vehicle. Additionally, the emergency vehicle information can enable remote vehicle assistance to monitor/manage an emergency vehicle encounter and take action as needed (e.g., take temporary control of the vehicle).

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, motorcycles, bicycles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "realization" refers to a trajectory generated by the sample-based maneuver realizer, described herein.

A "maneuver" is a change in position, speed or steering angle (heading) of an AV. Al maneuvers are trajectories but not all trajectories are maneuvers. E.g., an AV trajectory where the AV is traveling in a straight path at a constant speed is not a maneuver.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

As used herein, a "rulebook" is a data structure implementing a priority structure on a set of rules that are arranged based on their relative importance, where for any particular rule in the priority structure, the rule(s) having lower priority in the structure than the particular rule in the priority structure have lower importance than the particular rule. Possible priority structures include but are not limited to: hierarchical structures (e.g., total order or partial-order on the rules), non-hierarchical structures (e.g., a weighting system on the rules) or a hybrid priority structure in which subsets of rules are hierarchical but rules within each subset are non-hierarchical. Rules can include traffic laws, safety rules, ethical rules, local culture rules, passenger comfort rules and any other rules that could be used to evaluate a trajectory of a vehicle provided by any source (e.g., humans, text, regulations, websites).

As used herein, "ego vehicle" or "ego" refers to a virtual vehicle or AV with virtual sensors for sensing a virtual environment that is utilized by, for example, a planner to plan the route of the virtual AV in the virtual environment.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are a Global Navigation Satellite System (GNSS) receiver, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
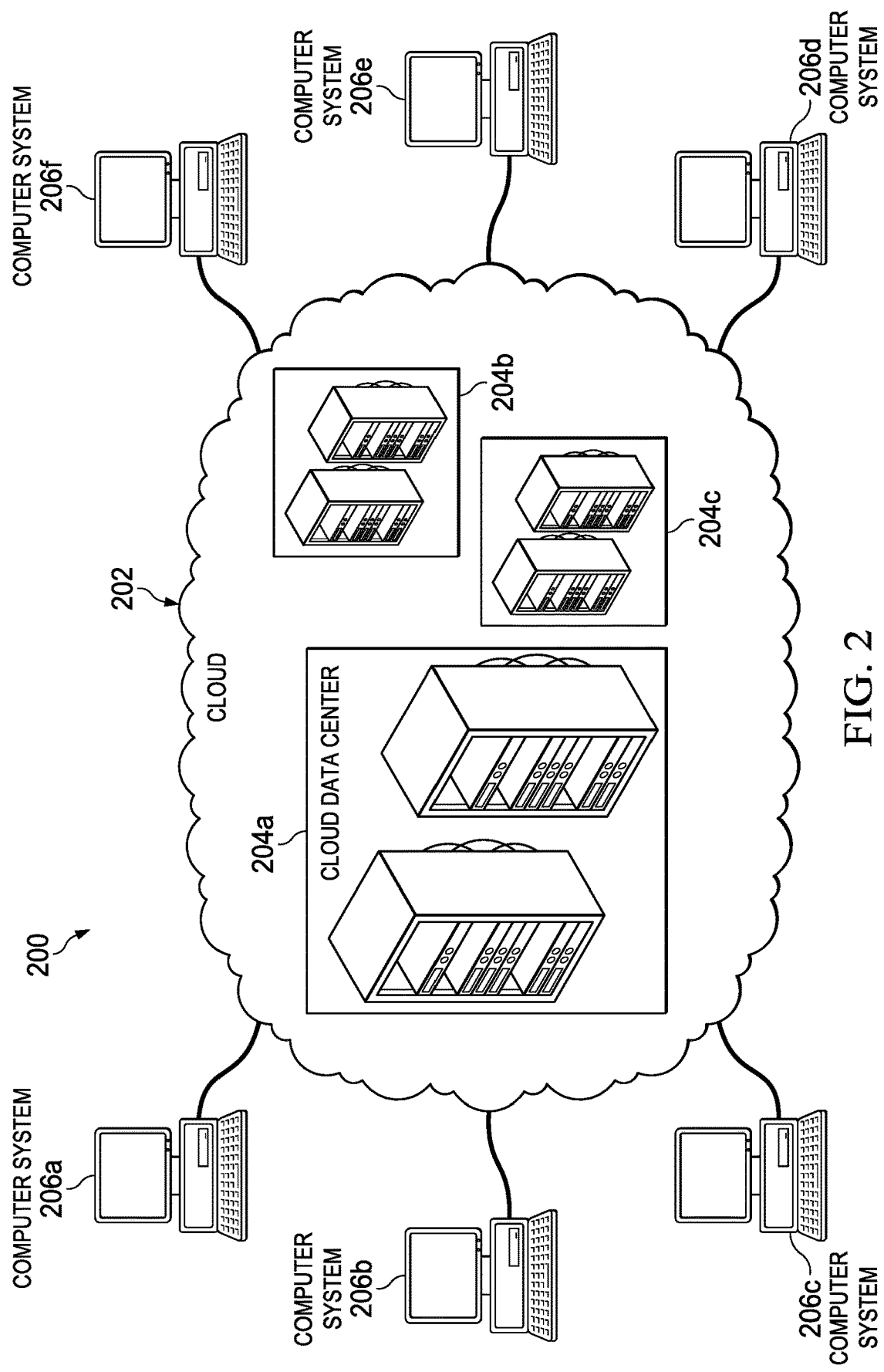
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
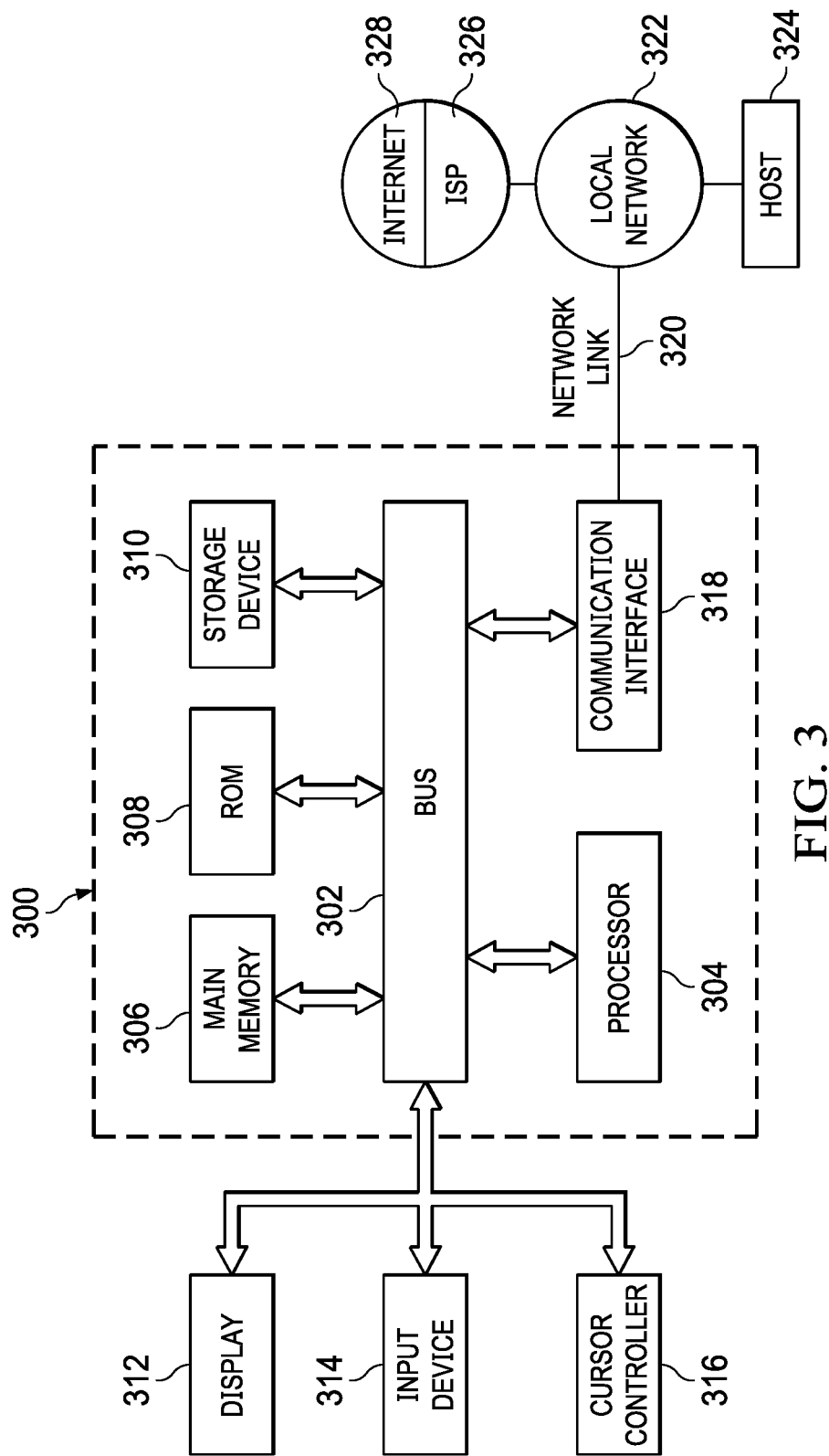
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
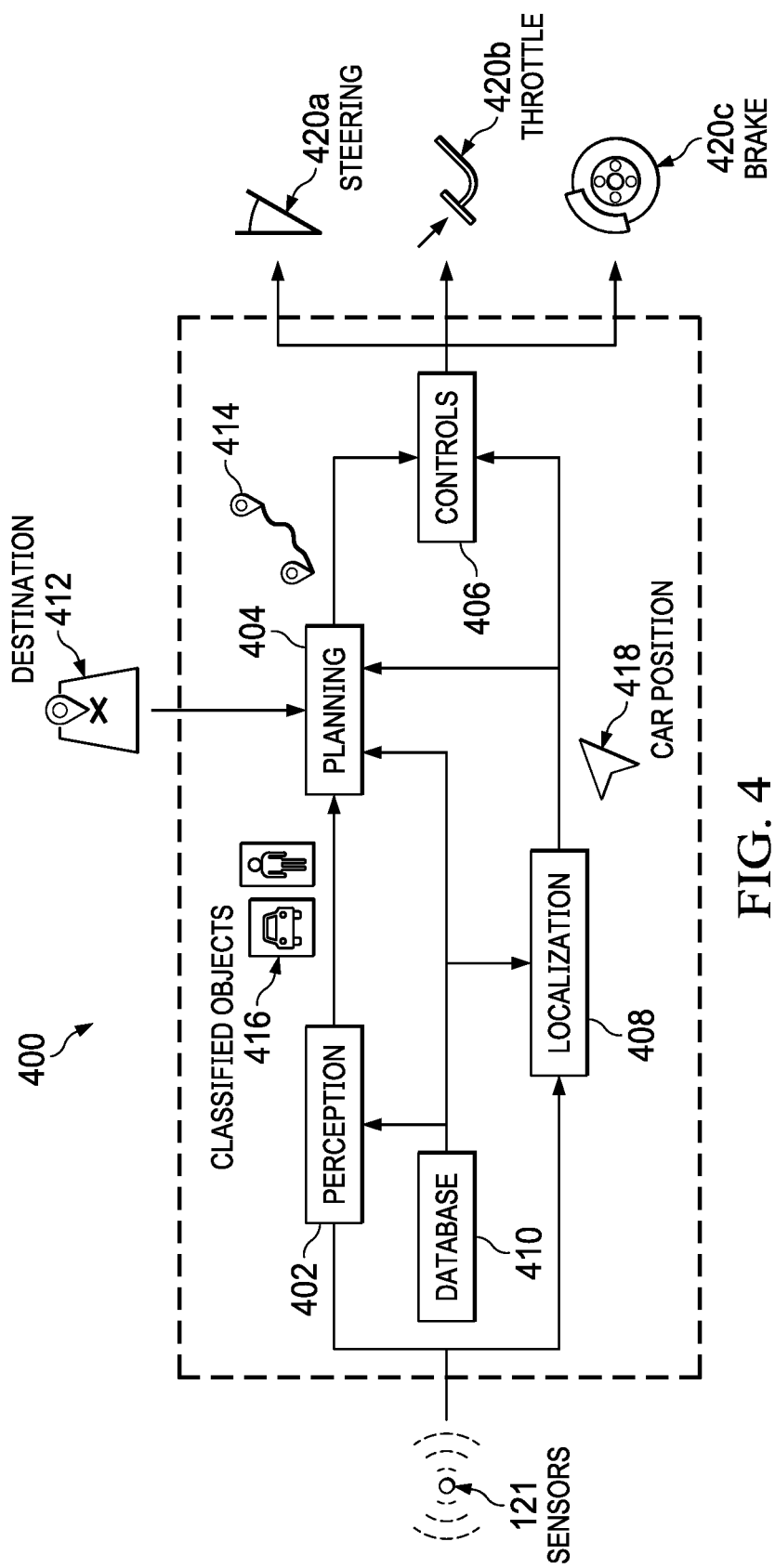
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS receiver and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

In an embodiment, any of the foregoing modules 402, 404, 406, 408 can send a request to a rule-based trajectory validation system 500 to validate a planned trajectory and receive a score for the trajectory, as described in further detail in reference to FIGS. 5-18.

Emergency Vehicle Detection System and Method

Figure 5:
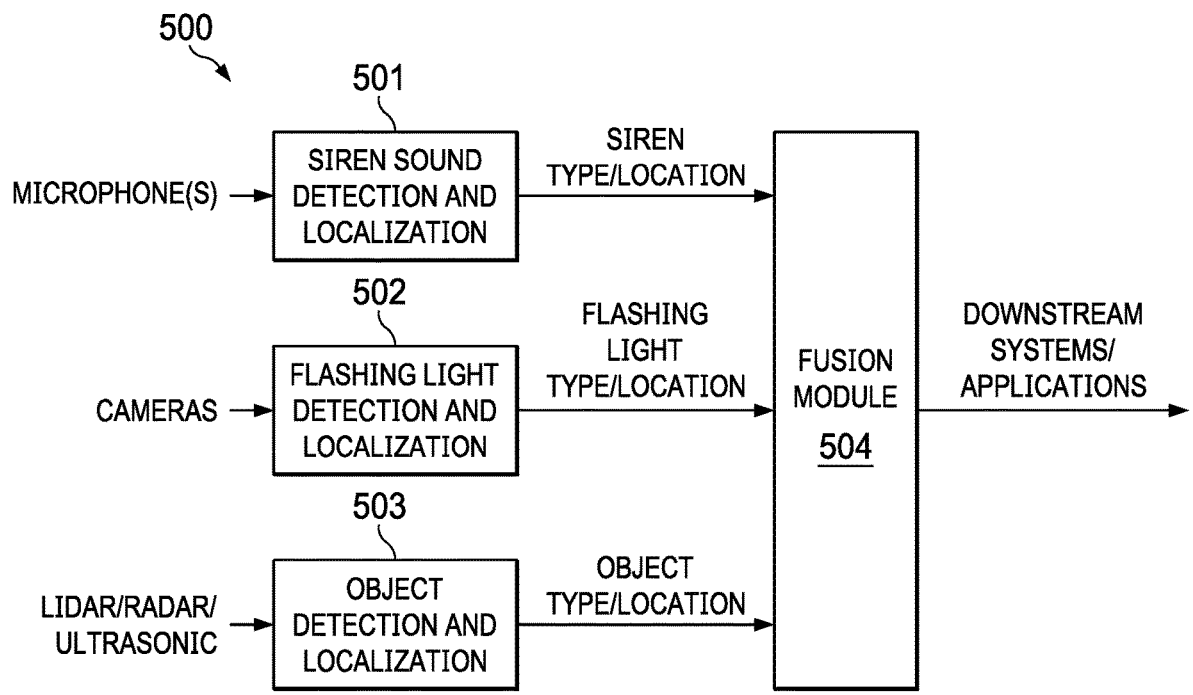
FIG. 5 is a block diagram of an emergency vehicle detection system, in accordance with one or more embodiments.

FIG. 5 is a block diagram of an emergency vehicle detection system 500, in accordance with one or more embodiments. Emergency vehicle detection system 500 includes siren sound detection and localization pipeline 501, flashing light detection and localization pipeline 502, object detection and localization pipeline 503 and fusion module 504.

Siren sound detection and localization pipeline 501 receives ambient audio captured by one or more microphones and analyzes the audio to detect the presence of siren sounds. If a siren sound is detected, the location of the siren sound in the vehicle's operating environment is estimated.

Flashing light detection and localization pipeline 502 receives camera images from one or more camera systems and analyzes the images to detect the presence of flashing lights. If a flashing light is detected, the location of the flashing light in the vehicle's operating environment is estimated. Object detection and localization pipeline 503 receives returns from light, radio frequency (RF) or sound waves emitted into the environment and analyzes the returns (reflections of waves off of objects in the environment) to detect one or more objects. If an object is detected, the location of the object in the vehicle's operating environment is estimated.

The estimated locations output by pipelines 501, 502, 503, are input into fusion module 504, which determines whether the estimated locations match. If the estimated locations match to within a specified matching criteria, the matched location of the emergency vehicle can be used by downstream systems or applications. For example, a perception module 402, planner 404 and/or controller module 406 of the AV 100 can use the estimated location of the emergency vehicle to predict behaviors of other agents in the operating environment, such as yielding or moving over to the side of the road, and then plan a route or trajectory in the operating environment for the vehicle based other prediction of agent behaviors. Pipelines 501, 502 and 503 will now be described in more detail in reference to FIGS. 6-8.

Figure 6:
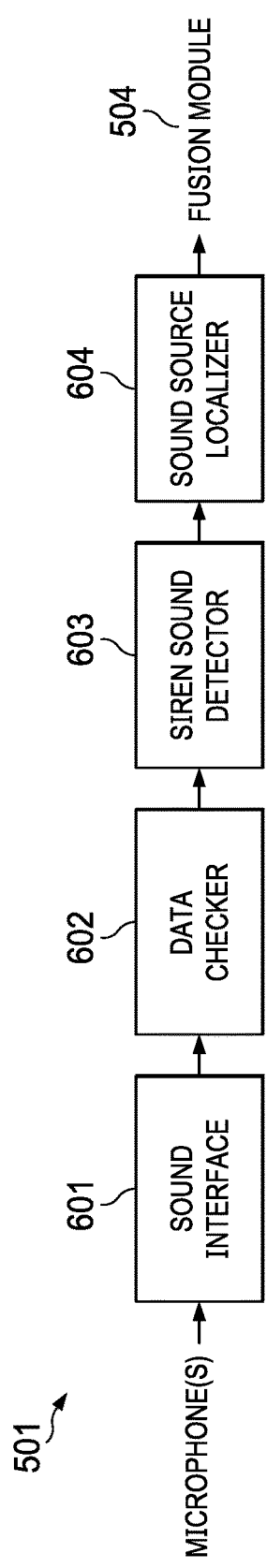
FIG. 6 is a block diagram of the siren sound detection and localization system 501 shown in FIG. 5, in accordance with one or more embodiments.

FIG. 6 is a block diagram of the siren sound detection and localization system 501 shown in FIG. 5, in accordance with one or more embodiments. Audio interface 601 receives ambient sounds and translates the sounds to digital signals. In an embodiment, ambient sound receiver includes an analog front end (AFE) that is coupled to one or more microphones or microphone arrays (e.g., a phased microphone array, MEMS microphone array, linear microphone array, beamforming microphone array). Each microphone is coupled to a pre-amplifier (e.g., a two stage differential amplifier) that includes band-pass filtering to give a flat response between, for example, 1.6 Hz and 24 kHz. A pre-amplifier increases the gain of a microphone output signal and differentially connects the signal to an analog-to-digital converter (ADC). In an embodiment, the ADC is a multi-bit sigma-delta ADC (e.g., 24-bits). The ADC can be sourced by the same clock to ensure low jitter, which is important for time correlated signals and the time-difference-of-arrival (TDOA) based algorithm that is described in further detail below. An application processor or logic circuitry, such as a field programmable gate array (FPGA) is coupled to the outputs of one or more ADCs via serial or parallel buss interfaces (e.g., Serial Peripheral Interface (SPI))

In an embodiment, an application embedded in the one or more processors or FPGA receives the digital signals output by the one or more ADCs and adds metadata, such as channel numbers, times, and error detection codes (e.g., Cyclic Redundancy Check (CRC) codes). The digital signals are input into data checker 602, which can be implemented in software or logic.

Data checker 602 analyzes the digital signals for error and blockage signatures, including but not limited to: missing data, muted signals and erroneous protocols. Missing or compromised data can be detected by, for example, error detection/correction codes or by dropped packets, etc. Muted signals can be detected by monitoring drops (e.g., drops that are unexpected and that do not follow an expected pattern for a known siren, etc., discuss below) in signal level, etc. If errors are detected, a diagnostic system is notified so that the error can be reported, analyzed and/or fixed if possible. The output of data checker 602 is input into siren sound detector 603.

Siren sound detector 602 analyzes the signals for siren sounds. This analysis includes but is not limited to: filtering noise (e.g., wind noise, road noise, tire noise, "urban" noise), comparing the filtered signals to known siren signals. Such comparing can be facilitated by first transforming the signals into a frequency domain using, for example, a fast Fourier transform (FFT) to determine the spectrum of the signal, then looking for energy in specific frequency bands that are known to contain siren sounds. In an embodiment, frequency matching algorithms can be used to match the frequency spectrums of the signals with reference frequency spectrums for siren content. In an embodiment, characteristics of reference frequency spectrums for different siren types (e.g., Yelp, Wail, Hi-Lo, Power Call, Air Horn and Howler siren sounds) can be stored and used by the matching algorithms.

In embodiment, a machine learning model (e.g., a neural network) is used to detect siren sounds in the signals output by data checker 602. In an embodiment, a level of confidence of siren detection is also estimated (e.g., a probability of siren sound detection) and output by the machine learning model. In an embodiment, if a particular level of confidence of a siren sound detection is below a defined confidence threshold, then the siren sound detection is considered a false detection and excluded from the input into fusion module 504.

If a siren sound is detected by siren sound detector 603 with a confidence level above the confidence threshold, sound source localizer 604 estimates the location of the siren sound source. The location of a siren sound source can be determined using a plurality of sensors (e.g., directional microphones, phase microphone arrays, MEMs microphones) placed at different locations around the vehicle and applying a sound source localization method to the microphone signals. Some examples of sound source localization methods include but are not limited to: time-of-arrival (TOA) measurements, TDOA measurements or direction-of-arrival (DOA) estimates, or by utilizing a steered response power (SRP) function. In an embodiment, three-dimensional (3D) sound source localization is implemented by sound source localizer 604 using, for example, microphone arrays, machine learning models, maximum likelihood, multi-signal classification (MUSIC), acoustic vector sensor (AVS) arrays, steered beamformers (e.g., a delay-and-sum (DAS) beamformer). In an embodiment, each sensor is a unidirectional microphone with a beam pattern (main lobe) that is sensitive along a narrow audio "field-of-view." Localization can be determined by comparing the intensities of the microphone signals, and the pointing direction of the microphone that outputs a signal with the highest intensity among all the microphone signals.

After detection and localization of a siren sound source, a location estimate of the siren sound source is input into fusion module 504.

Figure 7:
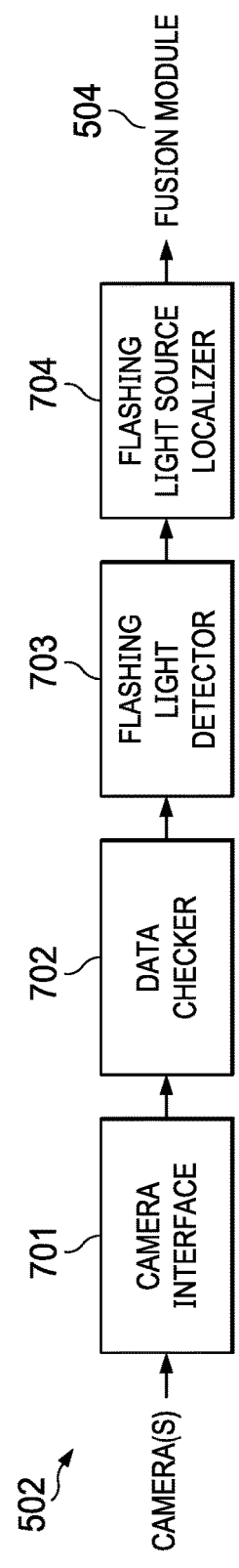
FIG. 7 is a block diagram of the flashing light detection and localization system shown in FIG. 5, in accordance with one or more embodiments.

FIG. 7 is a block diagram of the flashing light detection and localization system 502 shown in FIG. 5, in accordance with one or more embodiments. Camera interface 701 receives camera images and converts the camera images to digital signals. In an embodiment, camera interface 701 is a camera system that includes an image sensor that receives incident light (photons) that is focused through a lens or other optics. One or more sensors (e.g., CMOS sensors) convert the photons into electrons, electrons to analogue voltages, and then analogue voltages into digital values using one or more ADCs. An application processor or logic circuitry, such as a FPGA is coupled to the outputs of the one or more ADCs via serial or parallel bus interfaces (e.g., SPI interfaces).

In an embodiment, an application embedded in the one or more processors or FPGA receives the digital signals output by the one or more ADCs. The digital signals are input into data checker 702, which can be implemented in software or logic. Data checker 702 analyzes the digital signals for error and blockage signatures, including but not limited to: missing data, muted signals and erroneous protocols. Missing or compromised data can be detected by the error detection/correction codes or dropped packets, etc. Muted signals can be detected by monitoring drops in signal level, etc. If errors are detected, a diagnostic system is notified so that the error can be reported, analyzed, and/or fixed if possible. The output of data checker 702 is input into flashing light detector 703.

Flashing light detector 703 analyzes the signals for flashing lights. This analysis includes but is not limited to: filtering a sequence of camera images for low intensity light signals, comparing the resulting sequence of high intensity images to a sequence of reference images of known flashing lights. If one or more high-intensity camera images match one or more reference images to within a defined matching criteria, then flashing light detection is deemed to have occurred.

In an embodiment, a machine learning model (e.g., a neural network) is used to detect flashing lights. The output of the machine learning model can be a level of confidence (e.g., a probability) that a flashing light was detected. In an embodiment, if a particular level of confidence of a particular flashing light detection is below a defined confidence threshold, then the flashing light detection is considered a false detection and excluded from the input of fusion module 504. Some examples of suitable deep convolutional neural networks include but are not limited to: Bochkovskiy, A., Wang, C-Y., Hong-Yuan, M. L. YOLOv4: Optimal Speed and Accuracy of Object Detection. Retrieved from http://arxiv.org/pdf/2004.10934.pdf; Shaoqing, R., Kaiming, H., Girshick R., Sun, J. Faster R-CNN: Towards Real-Time Object Detection with Regional Proposal Networks. Retrieved from http://arxiv.org/pdf/1506.01497.pdf; and Liu, W., Anguelov, D., Erhan, D., Szegedy, C., Reed, S., Fu, C-Y, Berg, A. SSD:Single Shot MultiBox Detector. Retrieved at http://arxiv.org/pdf/1512.02325.pdf.

If a flashing light is detected by flashing light detector 703 with a confidence level (e.g., a probability of detection) above the confidence threshold, flashing light source localizer 704 estimates the location of the flashing light source. In an embodiment, an estimated location of the flashing light sources can be achieved by detecting an object in an image and additionally estimating its radial distance. This combined with the known camera position can be transformed to a location in world coordinates. In another embodiment, an estimate of the location of the flashing can be determined using triangulation, where multiple camera systems are positioned around the vehicle and localization is determined by observing key signatures within the camera images produced by the multiple cameras. For example, the key signatures can be a group of blinking high-intensity pixels in the camera images.

In an embodiment, methods for detecting blinking traffic lights can be used to detect flashing lights of emergency vehicles in real-time using one or more high-speed cameras, as described in, for example, Yabuuchi K., Hirano M., Senoo T., Kishi N., Ishikawa M. Real-Time Traffic Light Detection with Frequency Patterns Using a High-speed Camera. Sensors (Basel). 2020; 20(14):4035. Published 2020 Jul. 20. doi:10.3390/s20144035. In an alternative embodiment, for all objects, the position, size, and classification of the object is simultaneously learned in a single shot using neural network. For those objects of interest that may have flashing lights, such as emergency vehicles, an additional, conditional attribute is learned by the neural network based on whether flashing lights are detected. Performing this in a single shot allows fast inference time, while learning a conditional attribute reduces confusion with other flashing lights since the neural network will only learn to associate flashing lights that are already part of an object.

Using the methods described in Yabuuchi K. et al, the camera images are converted to gray scale and a bandpass filter is applied to the gray-scaled camera images in the frequency domain to enhance the flashing areas in the camera images. A binarization module estimates (e.g., using a Kalman filter) the state of the flashing light dynamics, which includes flashing amplitude, offset and phase. The state estimation is used to determine a threshold for binarizing the filtered images. The filtered images are then converted to binary images using the estimated threshold. A buffer module relays the binary images to a detection module that extracts contours from the peak binarized image and then uses the contours to exclude candidate pixels to prevent false detections. A classification module (e.g., a support vector machine), is then used to classify the light color using the contours and the original RGB camera images into three classes labeled red, yellow and green. The locations pixels labeled "red" can then be used as key signatures for localization, as described above. This technique could also be used by flashing light detector 603 for flashing light detection, as described above.

Figure 8:
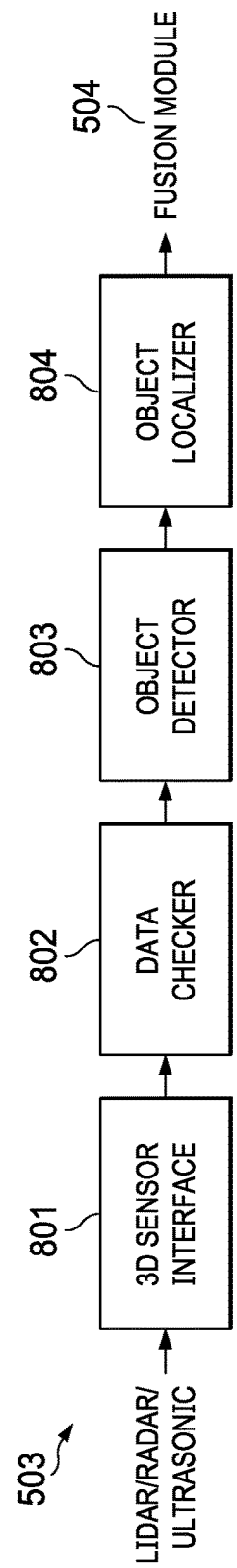
FIG. 8 is a block diagram of the object detection and localization system shown in FIG. 5, in accordance with one or more embodiments.

FIG. 8 is a block diagram of the object detection and localization system 503 shown in FIG. 5, in accordance with one or more embodiments.

3D Sensor interface 801 receives return signals from one or more 3D object detection sensors (e.g., LiDAR, RADAR, ultrasonic) and translates the return signals into digital signals. In an embodiment, 3D sensor interface 801 is a LiDAR system that includes one or more sensors that receive incident light (photons) returned/reflected from objects in the vehicle operating environment. The one or more sensors convert the photons into electrons, then from electrons to an analogue voltage, and then from an analogue voltage into digital signals using one or more ADCs. These digital signals are also referred to as a "point cloud." An application processor or logic circuitry, such as a FPGA is coupled to the outputs of the one or more ADCs via serial or parallel bus interfaces (e.g., SPI interfaces). In an embodiment, an application embedded in the one or more processors or FPGA receives the digital signals output by the one or more ADC.

The digital signals are input into data checker 802, which can be implemented in software or logic. Data checker 802 analyzes the digital signals for error and blockage signatures, including but not limited to: missing data, muted signals and erroneous protocols. Missing or compromised data can be detected by the error detection/correction codes or dropped packets, etc. Muted signals can be detected by monitoring drops in signal level, etc. If errors are detected, a diagnostic system of the vehicle or cloud-based diagnostic application is notified so that the error can be reported, analyzed and/or fixed if possible.

Object detector 802 (a deep convolutional neural network) receives the sensor data from data checker 802 and analyzes the sensor data for objects. In an embodiment, object detector 802 filters noise from the sensor data, such as returns from dust, leaves, snow, rain, humidity, etc., and combines or groups the returns with similar characteristics, such as range, range rate, height, local density, etc. The combined or grouped returns are then classified as object detections.

In an embodiment, machine learning is used for object detection. For example, a trained deep convolutional neural network (CNN) (e.g. a VGG-16 network) can be used to analyze the returns and output labeled bounding boxes around detected objects. A level of confidence of the object detections (e.g., a probability of an object detection) can also be output by the CNN. If the confidence is low, then the detected object is deemed a false detection and excluded from the input of fusion model 504. Object localizer 804 then receives the object data from object detector 803 and determines a range and azimuth of the object by determining a radial location via analysis of sensor position and orientation, or by determining a range location via analysis of sensor returns via TOF and/or return intensity analysis.

The estimated locations output by pipelines 501, 502, 503, are input into fusion module 504, which determines whether the estimated locations match. If the estimated locations match to within a specified matching criteria, the matched location of the emergency vehicle can be used by downstream systems or applications. For example, a perception module 402, planner 404 and/or controller module 406 of the AV 100 can use the estimated location of the emergency vehicle to predict behaviors of other agents in the operating environment, such as yielding or moving over to the side of the road, and then plan a route or trajectory in the operating environment for the vehicle based other prediction of agent behaviors.

In an embodiment, fusion module 504 receives as input siren, flashing light and/or object detections, and matches the siren, flashing light and/or object detections by: 1)

comparing similar range, azimuth, range rate, intensity, etc., 2) comparing the siren type with a vehicle type, and/or 3) comparing the detections, using a trained deep convolutional neural network.

In an embodiment, the fusion module 504 generates and sends an emergency vehicle presence signal to one or more downstream modules, such as planning module 402, perception module 404 or controller module 406. For example, the presence signal can indicate "present, "present and near," "present and far," "a number of detected emergency vehicles," range, range rate, azimuth, etc.

Example Processes

Figure 9:
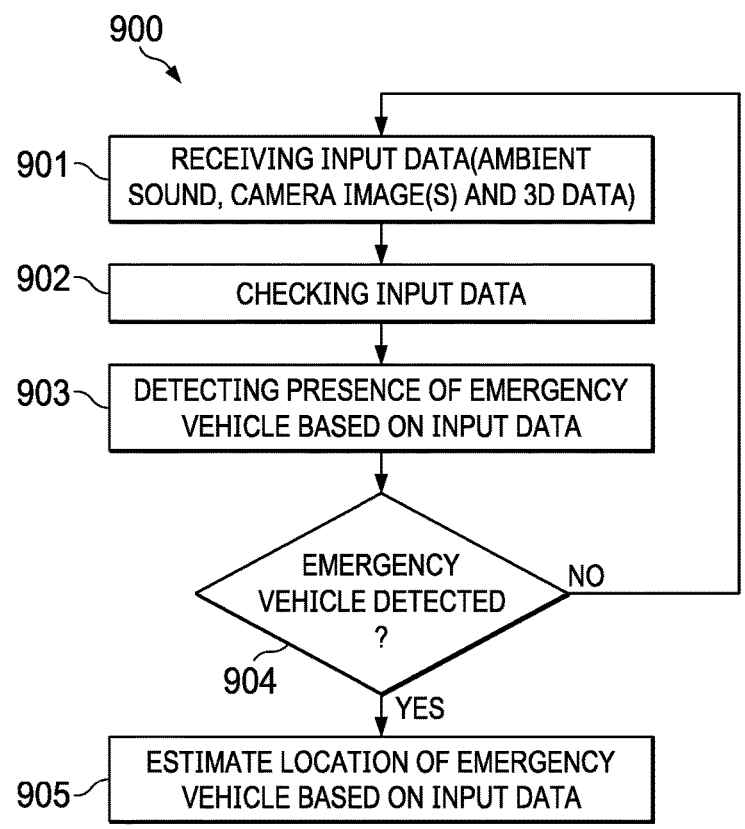
FIG. 9 is a flow diagram of an emergency vehicle detection process performed by the emergency vehicle detection system, in accordance with one or more embodiments

FIG. 9 is a flow diagram of an emergency vehicle detection process 900, in accordance with one or more embodiments. Process 900 can be implemented using, for example, computer system 300, as described in reference to FIG. 3.

Process 900 can begin by receiving input data from various sensor of a vehicle (901). The input data can include but is not limited to: ambient sound captured by one or more microphones, camera images captured by one or more cameras and returns from light waves, RF waves or acoustic waves emitted into the environment.

Process 900 continues by checking the input data for errors and blockage signatures (902). For example, the ambient sound, flashing lights and light returns are converted to digital signals, which are analyzed for errors and blockage signatures. If errors or blockage signatures are detected as a result of the analysis, a local vehicle diagnostic system and/or a cloud-based diagnostic system is used to determine the cause of the errors or blockage signatures. If, however, errors or blockage signatures are not detected, the digital signals are analyzed for siren sounds, flashing lights and objects.

Process 900 continues by detecting the presence of an emergency vehicle based on the input data (903). For example, the ambient sound captured by one or more microphones is analyzed to determine the presence of a siren sound, camera images captured by the one or more cameras are analyzed to detect the presence of flashing lights, and 3D data from the one or more 3D sensors is analyzed to determine the presence of static or dynamic objects in the environment, as described more fully in reference to FIGS. 6-8. If an emergency vehicle is detected based on a detection of a siren sound and flashing light (904), the location of the emergency vehicle is estimated based on the location of the siren sound and flashing light (905). For example, fusion module 505 receives as input siren, flashing light and/or object detections, and matches the siren, flashing light and/or object detections by: 1) comparing similar range, azimuth, range rate, intensity of the locations; 2) comparing the siren type with an emergency vehicle type using frequency signatures; and/or 3) comparing the detections using one or more deep CNNs trained on siren sounds, flashing lights and/or object detections as training data. The training data can be augmented to cover various environments (e.g., dense urban, rural) and environmental conditions (e.g., night, day, rainy, foggy, snowy) to increase the accuracy of the predictions output by the CNNs. The detection of a siren sound, flashing light and object at the same estimated location in the environment provides a higher level of confidence of an emergency vehicle detection than relying on siren sound detection, flashing light detection or object detection alone.

In an embodiment, the object detection pipeline 503 predicts 2D or 3D bounding boxes for objects that are labeled with an emergency vehicle type (e.g., police car, fire engine, ambulance) based on the physical appearance of the emergency vehicle (e.g., shape, size, color, profile, and/or the like), and augments the label with data indicating whether one or more lights of the emergency vehicle are flashing based on the output of pipeline 502, and/or whether the siren is activated based on the output of pipeline 501. The 2D or 3D bounding boxes can be used by, for example, planner module 404 of AV 100 to plan a route or trajectory in the operating environment. For example, if the presence of an emergency vehicle is detected, the planning module 404 can plan to maneuver to the side of the road based on the estimated location of the emergency vehicle and the physical and emotional states of other agents (e.g., other vehicles) in the operating environment that may respond in a predictable manner to the siren sound or flashing lights of the emergency vehicle (e.g., lane change, stop, move off the road) in accordance with state regulations.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:
1. A method comprising:
  receiving, with at least one processor, ambient sound;
  determining, with the at least one processor, if the ambient sound includes a siren sound;
  in accordance with determining that the ambient sound includes a siren sound, determining, with the at least one processor, a first location associated with a source of the siren sound;
  receiving, with the at least one processor, a camera image;
  determining, with the at least one processor, if the camera image includes a flashing light;
  in accordance with determining that the camera image includes a flashing light, determining, with the at least one processor, a second location associated with the flashing light;
  receiving, with the at least one processor, three-dimensional (3D) data;
  determining, with the at least one processor, if the 3D data includes an object;
  in accordance with determining that the 3D data includes an object, determining, with the at least one processor, a third location associated with the object;
  determining, with the at least one processor, a presence of an emergency vehicle based on the siren sound, the flashing light, and the object;
  determining, with the at least one processor, an estimated location of the emergency vehicle based on the first, second and third locations; and
  initiating, with the at least one processor, an action related to the emergency vehicle based on the determined presence of the emergency vehicle and the determined estimated location of the emergency vehicle.

2. The method of claim 1, wherein determining if the ambient sound includes a siren sound comprises:
   converting the ambient sound to digital signals;
   analyzing the digital signals for errors and blockage signatures;
   if errors or blockage signatures are detected,
      notifying a diagnostic system to determine a cause of the errors or blockage signatures; and
   if errors or blockage signatures are not detected,
      analyzing the digital signals for siren sounds.

3. The method of claim 1, wherein determining if the ambient sound includes a siren sound comprises:
   converting the ambient sound to digital signals;
   filtering noise from the digital signals;
   comparing the digital signals to reference signals; and
   determining a siren sound detection based on results of the comparing.

4. The method of claim 1, wherein determining if the ambient sound includes a siren sound comprises:
   converting the ambient sound to digital signals;
   analyzing, using machine learning, the digital signals; and
   determining a siren sound detection based on results of the analyzing.

5. The method of claim 4, further comprising:
   determining a level of confidence of the siren sound detection.

6. The method of claim 1, wherein the first location associated with the source of the siren sound is determined based on sound localization that is based on time of flight (TOF) analysis of signals output by multiple microphones positioned around the emergency vehicle.

7. The method of claim 1, wherein the first location associated with the source of the siren sound is determined based on locations and orientations of multiple unidirectional microphones, and the first location is determined based on an intensity of a key signature signal obtained from analysis of output signals of the multiple unidirectional microphones and their respective locations and orientations.

8. The method of claim 1, wherein determining if the camera image includes a flashing light comprises:
   analyzing the camera image for errors and blockage signatures;
   if errors or blockage signatures are detected,
      notifying a diagnostic system to determine a cause of the errors or blockage signatures; and
   if errors or blockage signatures are not detected,
      analyzing the camera image to determine if the camera image includes a flashing light.

9. The method of claim 1, wherein determining if the camera image includes a flashing light comprises:
   filtering the camera image to remove low intensity light signals, resulting in a high intensity image;
   comparing the high intensity image to a reference image; and
   determining a flashing light detection based on results of the comparing.

10. The method of claim 1, wherein determining if the camera image includes a flashing light comprises:
    analyzing, using machine learning, the camera image; and
    predicting a flashing light detection based on results of the analyzing.

11. The method of claim 10, further comprising:
    determining a level of confidence of the flashing light detection.

12. The method of claim 11, wherein the analyzing, using machine learning, the camera image includes:
    analyzing the camera image using a neural network that is trained to differentiate bright flashing lights from other bright lights.

13. The method of claim 1, wherein the second location associated with the flashing light is determined by:
    detecting flashing light signatures in multiple camera images captured by multiple cameras; and
    determining a radial location of the flashing light based on a position and orientation of each camera of the multiple cameras; or
    determining the second location based on triangulation of the positions and orientations of the multiple cameras.

14. The method of claim 1, wherein determining if the 3D data includes an object comprises:
    analyzing the 3D data for errors and blockage signatures;
    if errors or blockage signatures are detected,
       notifying a diagnostic system to determine a cause of the errors or blockage signatures; and
    if errors or blockage signatures are not detected,
       analyzing the 3D data to determine if the 3D data includes an object.

15. The method of claim 1, wherein determining if the 3D data includes an object comprises:
    filtering the 3D data to remove noise;
    separating the 3D data into groups with similar characteristics; and
    analyzing, using machine learning, the groups to determine an object detection.

16. The method of claim 15, further comprising:
    determining a level of confidence of the object detection.

17. The method of claim 1, wherein determining the third location comprises:
    determining a radial location of the object based on analysis of a sensor position and orientation of a sensor that detected the object.

18. The method of claim 1, wherein determining the presence of the emergency vehicle comprises:
    comparing siren, flashing light and object detections to determine whether the siren, flashing light and object detections match; and
    in accordance with determining a match, generating a signal indicating the presence of the emergency vehicle.

19. The method of claim 18, further comprising tracking the emergency vehicle based on the presence of the emergency vehicle.

20. A system comprising:
    at least one processor; and
    memory storing instructions that when executed by the at least one processor, cause the at least one processor to perform operations comprising:
    receiving ambient sound;
    determining if the ambient sound includes a siren sound;
    in accordance with determining that the ambient sound includes a siren sound, determining a first location associated with a source of the siren sound;
    receiving a camera image;
    determining if the camera image includes a flashing light;
    in accordance with determining that the camera image includes a flashing light, determining a second location associated with the flashing light;
    receiving three-dimensional (3D) data;
    determining if the 3D data includes an object;

in accordance with determining that the 3D data includes an object, determining a third location associated with the object;

determining a presence of an emergency vehicle based on the siren sound, the flashing light, and the object;

determining an estimated location of the emergency vehicle based on the first, second and third locations; and initiating an action related to the emergency vehicle based on the determined presence of the emergency vehicle, and the determined estimated location of the emergency vehicle.

21. A computer-readable storage medium having stored thereon instructions, that when executed by at least one processor, cause the at least one processor to perform operations comprising:

receiving ambient sound;

determining if the ambient sound includes a siren sound;

in accordance with determining that the ambient sound includes a siren sound, determining a first location associated with a source of the siren sound;

receiving a camera image;

determining if the camera image includes a flashing light;

in accordance with determining that the camera image includes a flashing light, determining a second location associated with the flashing light;

receiving three-dimensional (3D) data;

determining if the 3D data includes an object;

in accordance with determining that the 3D data includes an object, determining a third location associated with the object;

determining a presence of an emergency vehicle based on the siren sound, the flashing light, and the object;

determining an estimated location of the emergency vehicle based on the first, second and third locations; and initiating an action related to the emergency vehicle based on the determined presence of the emergency vehicle, and the determined estimated location of the emergency vehicle.

\* \* \* \* \*